July 6, 1965    R. S. HERBST    3,192,637
FIXTURE FOR TESTING GEARS
Filed May 24, 1962    13 Sheets-Sheet 1

FIG.1.

INVENTOR.
RONALD S. HERBST
BY S. J. Rotondi, A. J. Dupont
& S. Dubroff
ATTORNEYS:

July 6, 1965

R. S. HERBST 3,192,637

FIXTURE FOR TESTING GEARS

Filed May 24, 1962

*INVENTOR.*
RONALD S. HERBST

BY S. J. Rotondi,
A. J. Dupont & S. Dubroff

ATTORNEYS:

July 6, 1965  R. S. HERBST  3,192,637
FIXTURE FOR TESTING GEARS
Filed May 24, 1962  13 Sheets-Sheet 5

INVENTOR.
RONALD S. HERBST
BY S. J. Rotondi, A. J. Dupont
& S. Dubroff
ATTORNEYS.

July 6, 1965  R. S. HERBST  3,192,637
FIXTURE FOR TESTING GEARS
Filed May 24, 1962  13 Sheets-Sheet 6

*INVENTOR.*
RONALD S. HERBST
BY *S. J. Rotondi*
*A. J. Dupont & S. Dubroff*
ATTORNEYS July 6, 1965 R. S. HERBST 3,192,637
FIXTURE FOR TESTING GEARS
Filed May 24, 1962 13 Sheets-Sheet 9

INVENTOR.
RONALD S. HERBST
ATTORNEYS

July 6, 1965 R. S. HERBST 3,192,637
FIXTURE FOR TESTING GEARS
Filed May 24, 1962 13 Sheets-Sheet 11

INVENTOR.
RONALD S. HERBST
BY S. J. Rotondi
a. J. Dupont + S. Puhoff
ATTORNEYS:

United States Patent Office 3,192,637
Patented July 6, 1965

3,192,637
FIXTURE FOR TESTING GEARS
Ronald S. Herbst, Philadelphia, Pa., assignor to the United
States of America as represented by the Secretary of the
Army
Filed May 24, 1962, Ser. No. 197,552
10 Claims. (Cl. 33—179.5)
(Granted under Title 35, U.S. Code (1952), sec. 266)

The invention described herein may be manufactured and used by or for the Government for governmental purposes without the payment to me of any royalty thereon.

This invention relates to fixtures for testing gears, and more particularly to a fixture whereby the time theretofore required to test a gear is reduced by approximately 90%.

For testing the angular transmission of circular gears it has been customary to utilize high precision optical dividing heads in conjunction with special set-up accessories. Each tooth or tooth space is measured individually and the difference is computed to determine the amount of angular transmission error. Highly skilled operators are required to perform such tests and to make the required calculations. This method is acceptable only when limited strictly to gage inspection. It is too time consuming and expensive to be used for the inspection of high precision production gears.

The present invention avoids this difficulty by the provision of a gear test fixture which permits reading of the amount of angular transmission directly on a dial indicator. As the tested gear is rotated on the fixture spindle and indexed from tooth space to tooth space by means of the fixture index system, accumulative errors as well as individual tooth space to tooth space errors are detectable on the translation indicator system of the fixture. This makes it unnecessary to measure the angle of each tooth or tooth space individually and compute the difference in order to determine the amount of angular transmission error.

Thus the translation indicator system of the herein disclosed test fixture permits direct reading of the angular transmission errors, thereby eliminating the necessity for tooth to tooth calculations and effecting a time-saving of 25%. A further time-saving of 50% results from the fact that the indexing system of the test fixture is a functional part of the translation indicator system so that only half the tooth spaces of the gear require testing, the other half being directly and functionally related thereto. Additional savings are effected by the Go and Not Go principles which are incorporated in the fixture in accordance with the latest inspection engineering concepts where simplicity of design is stressed and special operator skills are minimized.

As hereinafter explained the present fixture is adapted for testing precision spur gears, helical gears, bevel gears, worm wheels, and segments of such gears whether they have an even or an odd number of teeth. The measurements made possible by this fixture are as follows:

(a) Location of tooth spaces with respect to center of fulcrum
(b) Tooth space index or spacing error
(c) Tooth space depth and width
(d) Pitch circle runout
(e) Pitch radius
(f) Accumulative error
(g) Angular transmission errors
(h) Axial alignment of a worm and worm wheel
(i) Location of worm axis with respect to thrust or mounting surface of the worm wheel
(j) Parallelism of worm shaft
(k) Analytical accuracy test of worm
(l) Pitch diameter concentricity of the worm
(m) Pitch and lead errors of the worm
(n) Functional test of the worm and worm wheel
(o) Composite error of the worm and worm wheel
(p) Accumulative errors of the worm and worm wheel
(q) Pressure and helix angle bearing The invention will be better understood from the following description when considered in connection with the accompanying drawings and its scope is indicated by the appended claims.

Referring to the drawings:

FIG. 21 is an explanatory diagram relating to the various steps to be followed in the testing of a gear having an even number of teeth, FIG. 22 is an explanatory diagram relating to the theory on which operation of the gear test fixture is based, FIG. 23 is an explanatory diagram relating to the testing of a gear having an odd number of teeth.

Figure 1:
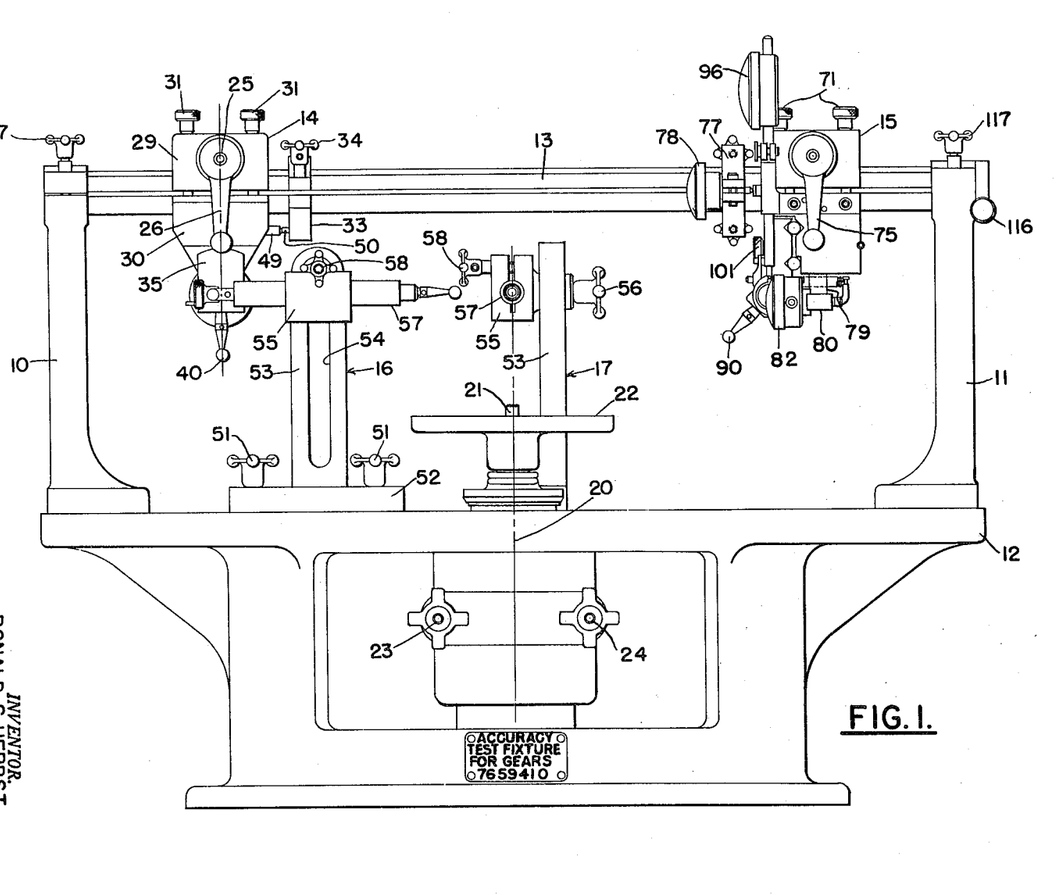
FIG. 1 illustrates a front elevation of the gear test fixture.
Figure 2:
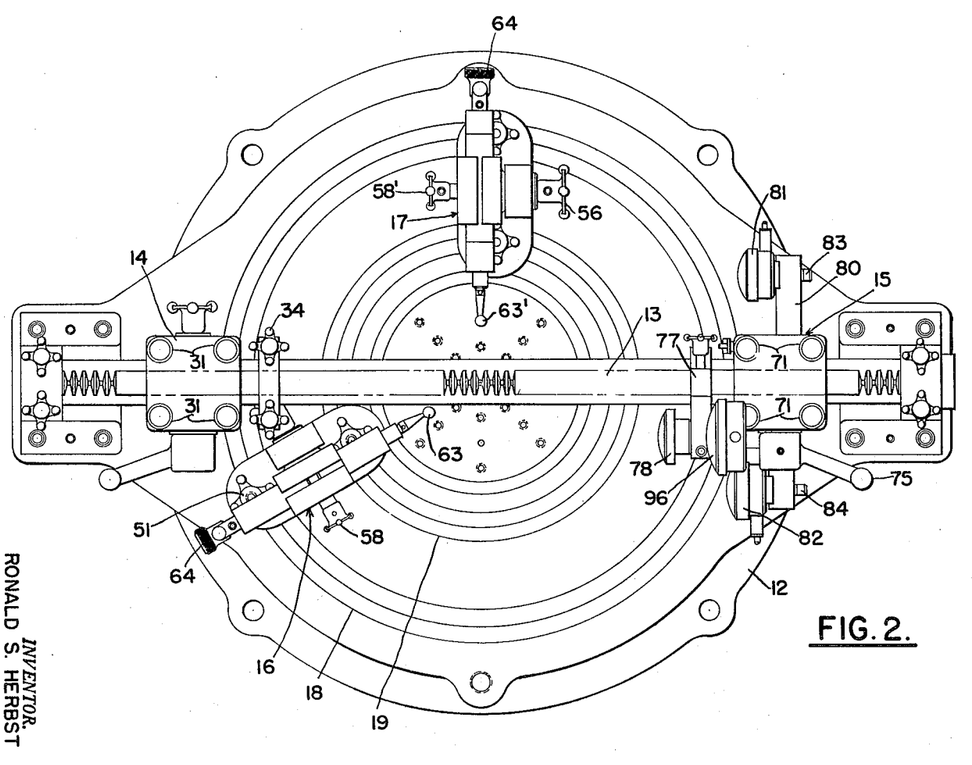
FIG. 2 is a top view of this fixture.

As indicated by FIG. 1, the gear test fixture of the present invention includes a pair of uprights 10 and 11 which are fixed to a base 12. Extending between the uprights 10 and 11 is a square-shaped rail or rack 13 by which are supported an index carriage assembly 14 and an indicator carriage assembly 15. Two sector index assemblies 16 and 17 are supported on the base 12 and are movable in tracks or guideways 18 and 19 which are concentric with the central vertical axis 20 of the base 12 as shown more clearly in FIG. 2.

A spindle 21 and a face-plate 22 are rotatable about the axis 20 and are supported in a conventional roller bearing assembly (not shown) which may be adjusted to any desired height by loosening and tightening screws 23 and 24.

Figure 3:
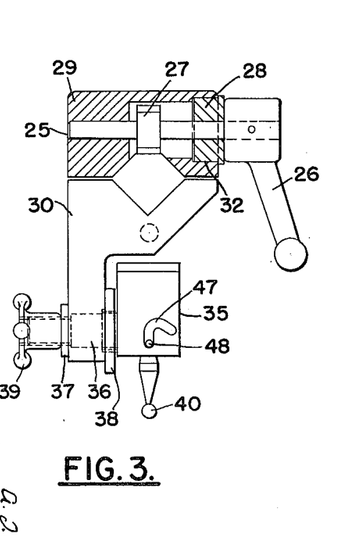
FIG. 3 is a view, partly in section, of the index carriage appearing in the upper left hand corner of FIG. 1.
Figure 4:
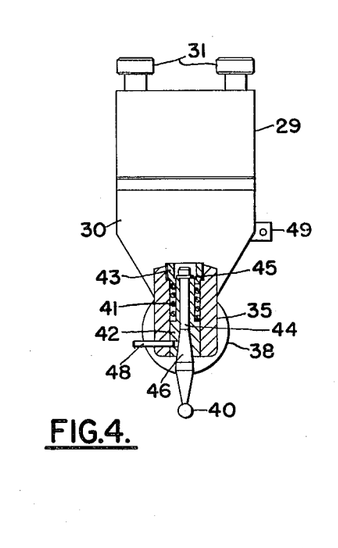
FIG. 4 is a different view of the index carriage shown in FIG. 3.

From FIGS. 1, 3 and 4 it can be seen that the index carriage assembly 14 is movable along the rack 13 by rotation of a shaft 25 to which are fixed a handle 26 and gear 27. The shaft 25 is journaled in member 29 and bearing 28 (FIG. 3) which receives the upper half of the square shaped rail or rack 13. The other half of the rack 13 is received in a member 30 which is attached to the member 29 by means of screws 31. With this construction the gear 27 meshes with the rack 13, the bearing 28 is secured in member 29 by means of thread 32. Rotation of shaft 25 functions to move the index carriage assembly along the rack 13. For stopping movement of the index carriage assembly 14, a stop 33 (FIG. 1) is movable along the rail or rack 13 and is clamped thereto by screws 34 (FIG. 2). A support 35 (FIGS. 3 and 4) is adjustably attached to the member 30 by means of a shaft 36 upon which are a threaded nut 38, a threaded knob 39 and a washer 37. By loosening the threaded knob 39, the nut 38 may be adjusted to space the support 35 more or less away from the member 30. It is also rotatable with the shaft 36 when the knob 39 is loosened. A ball contact assembly within the support 35 supports an index ball contact 40. As best seen in FIG. 4, this ball contact assembly includes a spring 41 which surrounds a tubular member 42 and extends between an outer shoulder of this member and the inner end of a perforated nut 43. The nut 43 is threaded into the upper end of the support 35 and has a recess on its outer end. Extending through the nut 43 is a bolt 44 which has at one end a head 45 resting in the recess of the nut 43 and at the other end an adapter 46 into which the shank of the ball contact 40 is threaded. Extending through a slot 47 in the support 35 is a pin 48 whereby the ball contact 40 may be moved from one fixed position to another. An extension 49 on the member 30 engages a contact 50 on the stop 33 as indicated by FIG. 1.

The sector index assemblies 16–17 (FIGS. 1 and 5) are similar. They each include knobs 51 which are threaded onto bolts extending through a base 52 into the circular ⊥-shaped slots or tracks 18 and 19 (FIG. 2) in the base 12. By loosening the knobs 51, the heads of the bolts are released to slide in the ⊥-shaped slots so that the base 52 may be moved from point to point about the circular track.

Figure 5:
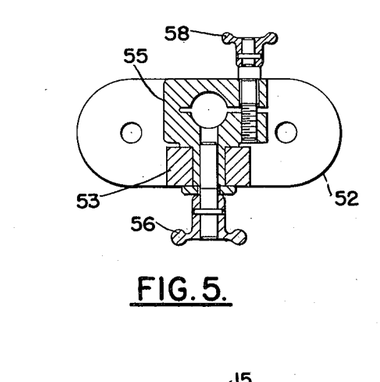
FIG. 5 is a top view, partly in section, of one of the sector index assembles of the fixture.

Fixed to the base 52 is an upright 53 having a slot 54. Adjustable along this slot is a bifurcated ball contact support 55 adapted to be clamped to the upright 53 by a knob 56. A ball contact assembly 57 extends through the support 55 and is clamped therein by rotation of a knob 58.

Figure 6:
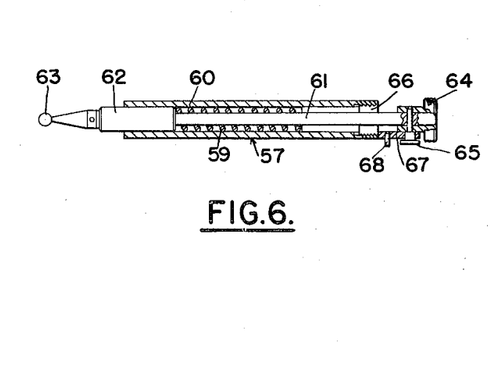
FIG. 6 is a sectional view of the ball point or ball contact assembly which forms a part of the sector index assembly.

The structure of the ball contact assembly 57 is indicated by FIG. 6. It includes a spring 59 which is located between a tubular member 60 and a rod or bolt 61. At one end of the rod 61 is an adapter 62 into which a ball point 63 is threaded. At the other end of the rod 61 is a thumb screw 64 which is fixed to the rod 61 by a shoulder screw 65. The spiral spring 59 is held between the adapter 62 and the forward face of a nut 66 which is threaded into the rearward end of the tubular member 60.

In use the spring 59 causes the ball point 63 to exert an initial pressure on a test gear. This pressure is increased by moving the ball contact assembly 57 against the test gear, through support 55 (FIG. 5). When the load on the test gear is so increased the assembly is locked in position by rotating the clamping knob 58. Movable to a position between the nut 66 and the thumb wheel 64 is a stop 67 which is pivotally mounted on the shoulder screw 65 and is rotatable about this screw by means of a pin or handle 68 protruding outwardly from the stop. When the stop 67 is pivoted to the position shown in FIG. 6 wherein its forward portion abuts nut 66, the ball contact 63 is retained in a retracted position while forward pressure is exerted thereon by spring 59.

The structure of the indicator ball carriage assembly 15 (FIGS. 1 and 2) is shown by FIGS. 7 to 11. It can be seen from these figures that the assembly 15 includes members 69 and 70 which are attached to the square rack 13 (FIGS. 1 and 2) by means of rack pressure adjusting screws 71.

Extending through the member 69 is a shaft 72 (FIG. 10) to which is fixed gear 73 and handle 75. The shaft 72 is journaled in member 69 and insert bearing 74. Bearing 74 is secured to member 69 by means of thread 76. The gear 73 meshes with the rack 13. Upon rotation of the handle 75 the indicator ball carriage assembly 15 is moved along the rack 13, the inward limit of this movement being defined by a stop 77 (FIG. 1) which is adjustable longitudinally along rack 13 by appropriate clamping means and upon which is mounted a pitch radius indicator 78 that is actuated by an abutment on carriage 15.

An extension 79 (FIG. 7) of the member 70 is fixed to a transversely extending bar 80 along which a pair of translation indicators 81 and 82 (FIGS. 2, 7, 8) are longitudinally adjustable by setting of thumb screws or knobs 83 and 84 respectively.

Figure 7:
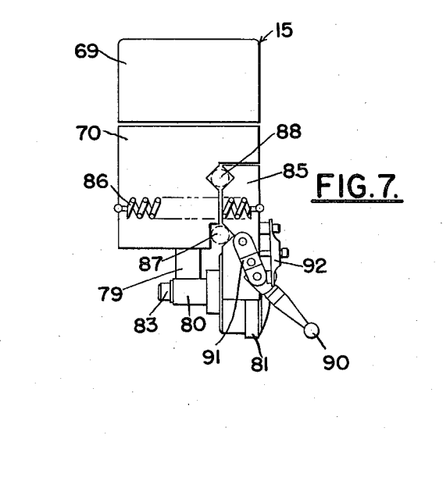
FIGS. 7 to 11 are different views of the indicator ball contact carriage assembly of the fixture.

The translation indicators 81 and 82 are actuated by a member 85 (FIGS. 7, 8) which is mechanically coupled to the fixed member 70 by means of spring means 86 and ball bearings 87 and 88 (FIG. 7). Rotatably mounted in the member 85 is a transversely extending shaft 89 (FIG. 8) to which an indicator ball contact 90 is attached. The shaft 89 is held against a washer W by a spring clamp member 91 and ball bearing 91A, and the shaft 89 is held in a suitably formed V-shaped bearing (not shown) in member 85 by spring clamp members 92 and 93.

Figure 9:
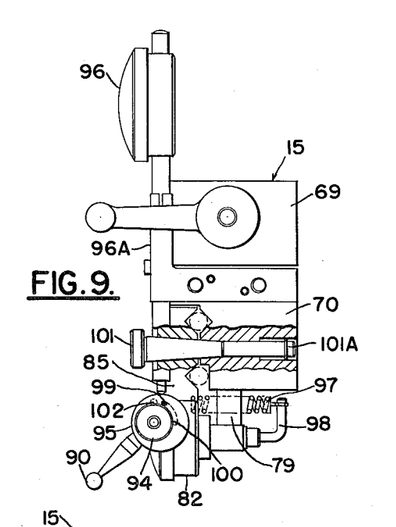
Figure 10:
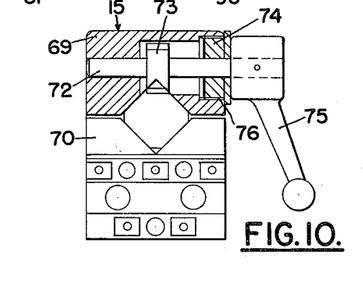
Figure 11:
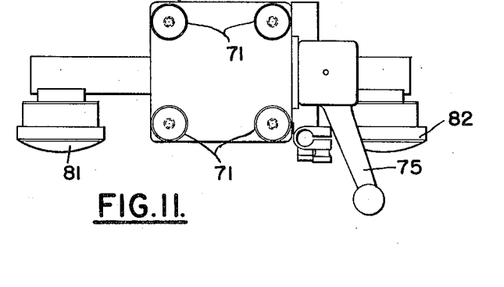
Figure 12:
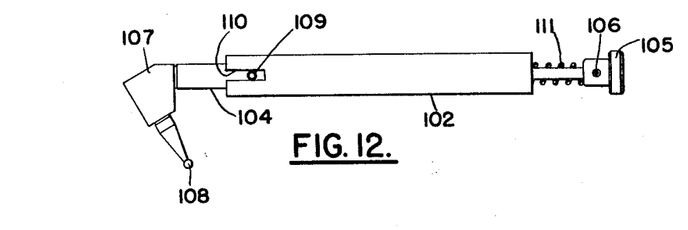
FIGS. 12 to 16 are different views of a ball contact assembly for testing internal gears.
Figure 13:
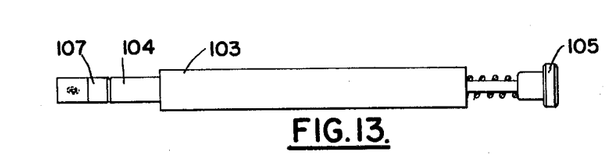
Figure 14:
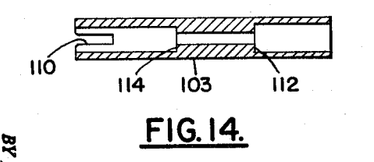
Figure 15:
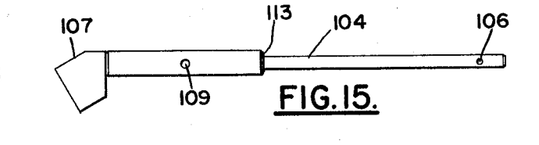
Figure 16:
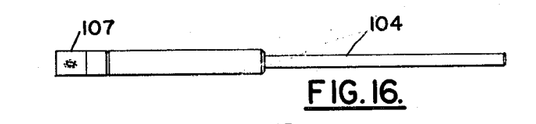
Figure 17:
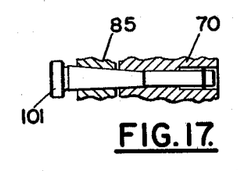
FIG. 17 is a sectional view of a centering pin which forms a part of the indicator ball contact carriage assembly, FIGS. 18 to 20 relate to the procedure to be followed in setting up the fixture for testing a gear, a sectional view of a worm wheel being shown in FIG. 20 as ready for test.

A thumb screw 94 is threaded onto the end of the shaft 89 and functions to fix a cam 95 to the shaft 89 and to release it for rotational adjustment thereon. The rotational adjustment of the cam 95 relative to shaft 89 determines the initial setting of a pressure indicator 96 with respect to ball contact 90 through indicator cam follower 95A. This setting is also accomplished by adjusting the indicator itself along its support 96A (FIG. 9). Movement of ball contact 90 under test conditions will be reflected on the indicator 96 through rotation of cam 95.

A spiral spring 97 (FIG. 9), extending between a fixed anchor 98 and a pin 102 (FIGS. 8, 9) on the cam 95, tensions an end wall of slot 100 in a side face of the cam against a stop pin 99. The stop pin 99 rides in slot 100 in the cam side face and is fixed to the member 85. With this arrangement, the ball contact 90 and shaft 89 are rotatable to a limited extent in a counter-clockwise direction against the tension of the spring 97.

Figure 8:
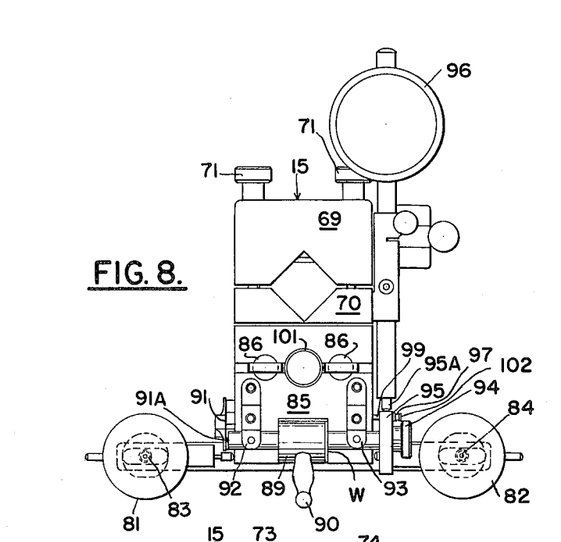

An indicator carriage centering pin 101 (FIGS. 8, 9)

interlocks the members 70 and 85 through appropriate mating tapered surfaces. As hereinafter explained, partial withdrawal of this centering pin, as limited by laterally extending surfaces of washer 101A, permits the highly sensitive member or indicator carriage 85 to react to the slightest sideward pressure exerted against the ball contact 90. Centering pin 101 is wedged in the locked position so that members 70 and 85 are interlocked (FIG. 9) from relative movement.

Figure 30:
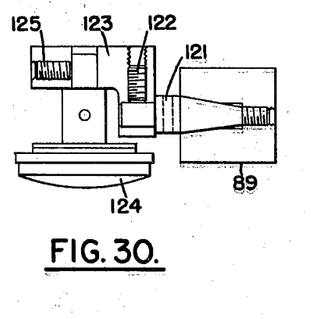
FIGS. 30 and 31 illustrate the use of a conventional indicator in connection with the gear testing fixture.
Figure 31:
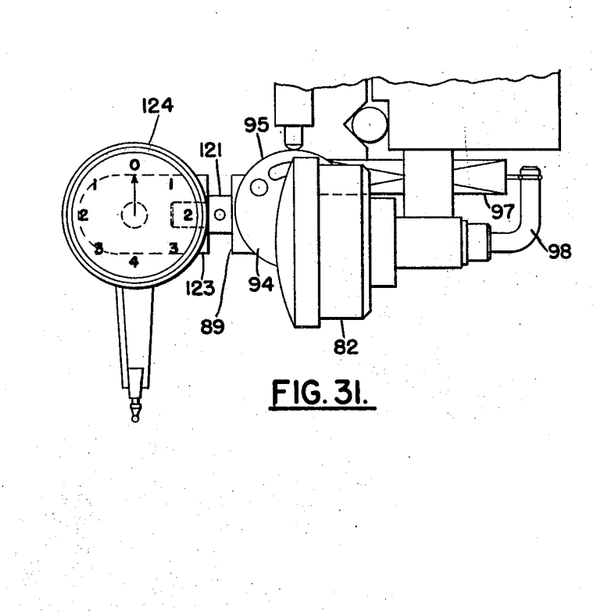

As indicated by FIGS. 30 and 31 the ball contact 90 may be replaced by an indicator assembly including a commercial indicator 124 with appropriate securing means therefor, in which case the cam 95 is adjusted and the shaft 89 rotated so that the indicator is placed in a convenient working position. This indicator assembly is provided with an adapter 121 and an L-shaped member 123 secured thereto by screw 122. The member 123 supports the indicator 124 which is fixed thereto by a screw 125. The indicator 124 has a ball contact 126 and may be of any suitable type such as the Ames Truetest Indicator, Model No. 2 manufactured by B. C. Ames Co., Waltham, Mass. With the centering pin 101 (FIG. 9) in its locking position, ball contact 90 is removed from its threaded attachment in shaft portion 89 (FIG. 8) and the adapter 121 of the replacement indicator assembly is screw threaded into its position upon shaft 89.

FIGS. 12 to 15 illustrate a ball contact index assembly 102 suitable for cooperation with indicator carriage assembly 15 in the testing of internal gears. With assembly 15 overlying an internal gear such that ball contact 90 engages an internal tooth space (FIG. 26) assembly 102 replaces the ball contact assembly 57 (FIG. 1). Assembly 102 includes a tubular member 103 with a rod 104 extending therethrough. The rod 104 has at one end a button 105 which is fixed thereto by a pin 106. At the other end of the rod 104 is an adapter 107 which supports a ball contact 108. A pin 109 fixed to the rod 104 rides in a slot 110 at the adapter end of the tubular member 103 and a spiral spring 111 extends between the base of the button 105 and an inner shoulder 112 (FIG. 14) of the tubular member. The rod 104 (FIG. 15) has intermediate its ends an outer shoulder 113 which is alined with an inner shoulder 114 of the tubular member 103. Under these conditions, the spring 111 exerts a slight retractive force on the rod 104 during the testing of an internal gear thereby engaging the ball contact 108 (FIGS. 12, 26) lightly with the teeth of the internal gear.

*Set-up of fixture for testing*

Figure 18:
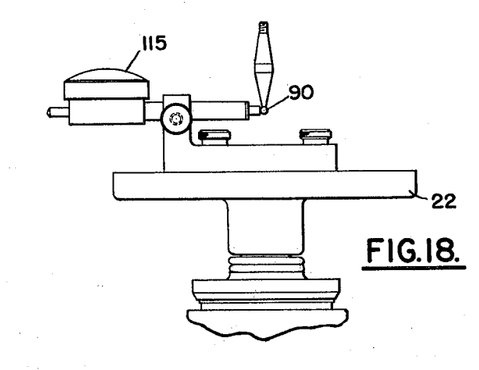

In setting up the fixture of the present invention for the testing of gears having an even number of teeth, the centering pin 101 is engaged into its locking position, and the ball contacts 90 and 40 are set to where they are in a convenient working position and parallel to the face plate 22. The ball contact 90 is next centered with respect to the locator spindle 21 by means of the centering indicator 115 (FIG. 18). This is done by rotating the face plate 22 clockwise 180° and then counterclockwise 180° to test the centering. When the ball contact 90 is not properly centered, knobs 117 are loosened and the thumb screws 116 (FIG. 1), which rotate rail 13 about its longitudinal axis, are adjusted until the centering indicator 115 remains at zero setting at both ends of the 180° rotation. When this is accomplished, the hand knobs 117 are tightened, clamping rail 13 in the desired position between uprights 10, 11.

Figures 19, 20, 21, 22, 23:
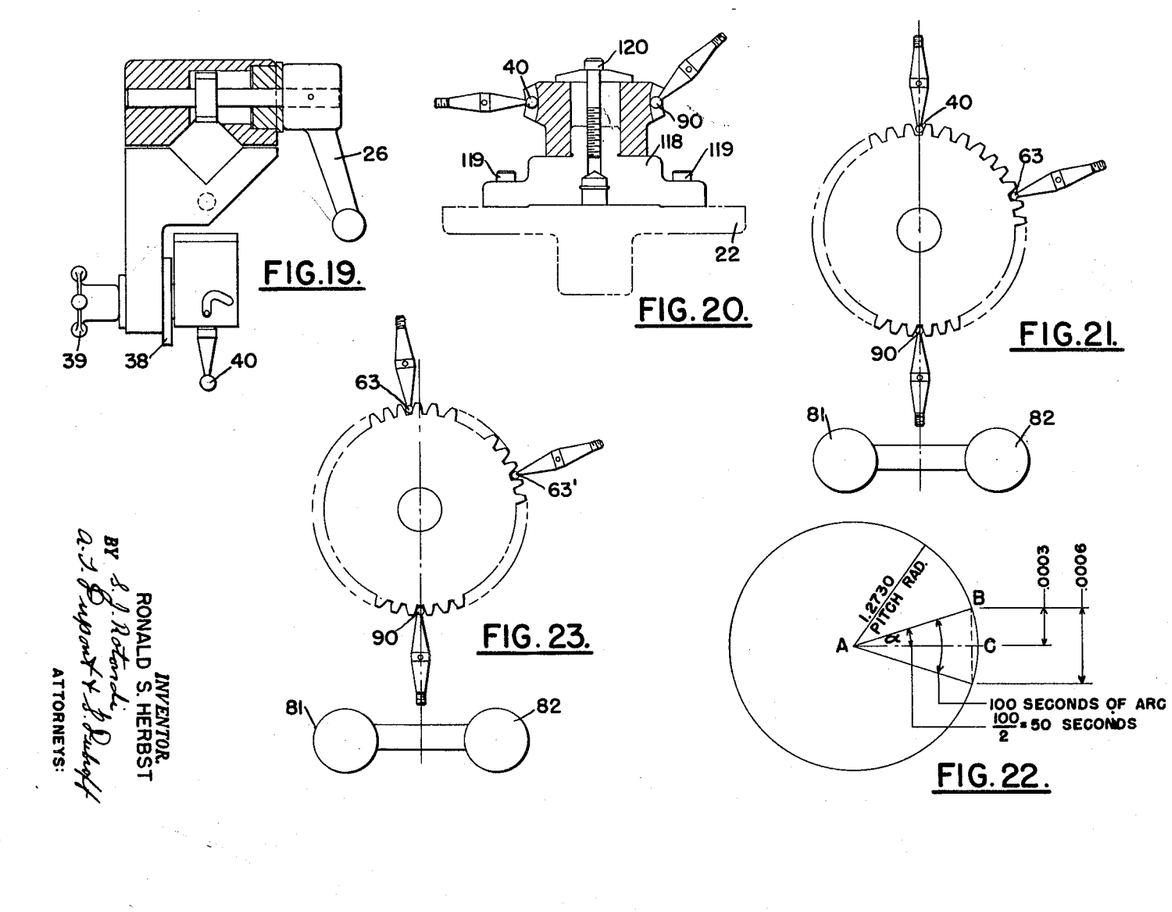

The ball contact 40 is centered in the same manner as the ball point 90 except that the adjustments are made by means of an adjusting nut 38 (FIG. 19).

With the test fixture set up as indicated above, an appropriate adapter 118 (FIG. 20) is placed on the face plate 22 and secured thereto by screws 119. The gear to be tested is then secured to the adapter by means of clamping screw 120. This locates the gear bore axis or fulcrum point so that it is coaxial with respect to the rotational axis of locator spindle 21. With the gear thus fixed to the adapter, a gear having an even number of teeth is tested as follows:

*Testing of gears having an even number of teeth*

(1) The rail index contact 40 is engaged in a gear tooth space.

This is done by rotating the gear tooth space into alinement with the index contact and rotating the carriage lever 26 to move the ball contact 40 into the tooth space. This fixes the selected gear tooth space rigidly on the centerline through the centers of the fulcrum and the ball contact.

(2) The translation indicators 81 and 82 are set to a zero reading.

(3) The indicator carriage centering pin 101 is withdrawn.

This permits the highly sensitive indicator carriage 85 to react to the slightest sideward pressure exerted against the indicator ball contact 90. Subsequently, the amount of this movement will be detectable on the translation indicator 81 or 82. It is to be understood that one of the translation indicators 81 or 82 is to be used for zero reference set-up and for all readings. The other translation indicator is to be used for reference only and its purpose is to show any accidental disturbance of the zero indication. Either indicator may be used as the zero indicator and must be so used throughout the entire test.

(4) The indicator carriage assembly lever 75 is rotated to bring the indicator ball contact 90 into the gear tooth space directly opposite rail index ball contact 40 as indicated by FIG. 21.

(5) Observe the translation indicators 81 and 82.

If there is a deviation from zero of more than the total allowable angular transmission error, the tooth spaces are not directly opposite, the teeth are out of position with respect to the fulcrum, and the gear is rejected for excessive angular transmission error. If the translation indicator remains at zero or within the allowable angular transmission tolerance, the test is continued.

(6) Adjust the pressure indicator 96 to zero reading.

This is done by means of cam 95 (FIG. 9) or by adjusting the indicator along its support. The sole purpose of the pressure indicator 96 is to insure exact equalized pressure of the ball contact 90 throughout the entire tooth space zone of excursion.

(7) Adjust the pitch radius indicator 78 to zero reading by means (not shown).

This indicator 78 cooperates with pressure indicator 96 to measure the difference in pitch radius, indicate pitch runout, and detect errors in tooth space width.

(8) Set sector index assembly 16 so that sector index ball contact 63 is engaged in a tooth space adjacent to the ball contact 40 as indicated in FIG. 21.

If the reading of translation indicator 81 or 82 changes upon engagement of ball contact 63 with the tooth space, adjust sector index assembly 17 so that reading is restored to its former value.

(9) Test successive tooth spaces one at a time commencing with any desired tooth space by (1) engaging indicator ball 90 in a first tooth space (FIG. 21), (2) engaging rail index ball contact 40 in a diametrically opposed tooth space and recording the reading of the translation indicator 81 or 82 on the following chart, (3) disengaging the ball contact 40, (4) engaging the sector index ball contact 63 and recording the reading of indicators 81 or 82 on the chart, (5) disengaging the contact 63 and (6) recording the tooth space number engaged by ball contact 90, the readings of the pitch radius indicator 78 and the pressure indicator 96.

With the various data recorded as indicated, they would appear as shown in the following chart:

| Col. 1 | Col. 2 | Col. 3 | Angular transmission | | Col. 6 |
| --- | --- | --- | --- | --- | --- |
| | | | Col. 4 | Col. 5 | |
| Tooth Space No. | Pressure indicator setting | Pitch radius | Index 40 | Index 63 | |
| 1 | 0 | 0 | +.00 01 | +.00 01 | |
| 2 | 0 | +.00 02 | +.00 02 | 0 | |
| 3 | 0 | +.00 03 | +.00 02 | 0 | |
| 4 | 0 | +.00 04 | +.00 02 | 0 | |
| 5 | 0 | +.00 05 | 0 | +.00 02 | |
| 6 | 0 | +.00 09 | 0 | +.00 04 | |
| 7 | 0 | +.00 10 | 0 | +.00 06 | |
| 8 | 0 | [1] +.00 13 | 0 | [3] +.00 08 | .0002 over |
| 9 | 0 | +.00 10 | 0 | +.00 06 | |
| 10 | 0 | +.00 05 | 0 | +.00 04 | |
| 11 | 0 | 0 | 0 | +.00 02 | |
| 12 | 0 | 0 | 0 | 0 | |
| 13 | 0 | −.00 05 | 0 | −.00 02 | |
| 14 | 0 | [1] −.00 07 | 0 | −.00 04 | |
| 15 | 0 | −.00 02 | −.00 02 | −.00 04 | |
| 16 | 0 | 0 | −.00 02 | −.00 04 | |
| 17 | 0 | [2] −.008 | −.00 02 | −.00 02 | |
| 18 | 0 | 0 | [3] −.00 06 | 0 | |
| 19 | 0 | 0 | −.00 01 | +.00 01 | |

[1] Total Indicator Runout is .0015 over, viz:
.0013
+.0007
———
.0020 (Total Runout)
−.0005 (Allowable Runout)
———
.0015 Over

[2] Deep Tooth Space .0075 over, viz:
.0080 (Max. Runout)
−.0005 (Allowable Runout)
———
.0075 Over

[3] Max. Accumulative Angular Error .0008 over, viz:
.0008
+.0006
———
.0014 (Total Angular error of arc)
−.0006 (Allowable Angular error of arc)
———
.0008 Over This chart is to be read on the assumption that the requirements of the tested gear are as follows:
(1) Number of teeth 36.
(2) Length of pitch radius 1.2730.
(3) Pitch circle runout not to exceed .0005 total indicator reading.
(4) Angular error measured between any two teeth not to exceed 100 seconds of arc.
(5) Accumulative angular error not to exceed 100 seconds of arc.

Convert the 100 seconds of arc into chord measurement as indicated by FIG. 22. Let the length of the pitch radius equal the length of the hypotenuse of a right angle triangle A–B–C. Bisect the 100 seconds angular transmission tolerance and let the resultant 50 seconds equal the angle α. Calculate the length of the side B–C opposite the 50 seconds angle which, in this example equals .0003 or half the total allowable angular error. Therefore the total maximum allowable error for 100 seconds of arc is .0006 straight line (chord) linear dimension. This amount (.0006) is the maximum allowable movement of the translation indicator 81 or 82.

As previously indicated, one of the translation indicators 81 or 82 is to be used for zero reference, set-up and for all readings. The other translation indicator is to be utilized for reference only and its purpose is to show any accidental disturbance of the zero indicator. Either indicator may be chosen for use as the zero indicator but the same indicator must be used throughout the entire test. Thus the angular transmission errors are the summation of displacements caused by the ball contacts 40 and 63 (FIG. 21). These displacements are produced at the ball contact 90, are read on the translation indicator 81 or 82, and are recorded in columns 4 and 5 of the chart as previously indicated.

In interpreting the chart, columns 1 and 3 are examined noting the gradual increase and decrease of the pitch radius between tooth spaces No. 2 and No. 15. It is also to be noted that the greatest of these errors appears at spaces No. 8 and No. 14, and that these errors are in the plus and minus directions. These errors, when added together, represent the total indicator reading of the pitch circle runout, applicable to half the gear being tested. A spot check may be made to determine the total runout by rotating the gear to the tooth spaces Nos. 8 and 14 and taking an additional reading in each position.

From the chart, it can be seen that there is a sudden drop at tooth space No. 17 in column 3. This indicates a deep cut and wide tooth space since there is no significant change in the adjacent two spaces Nos. 16 and 18. Encircled figures on the chart indicate that the tested gear should be rejected for the following reasons:
(1) Angular error .0002 over tolerance.
(2) Accumulative angular error .0008 over tolerance.
(3) Pitch circle runout .0015 over tolerance.
(4) Deep tooth space .0075 over tolerance.

*Testing of gears having an odd number of teeth*

Referring to FIG. 23, it is seen that, due to this gear having an odd number of teeth, only one tooth space falls on the centerline passing through the center of fulcrum, and that this space is engaged by the indicator ball contact 90 in the same way as in the set-up of FIG. 21. In this test, the index carriage assembly and its ball contact 40 are replaced by the sector index assembly 17 and its ball contact 63'. The testing of gears having an odd number of teeth involves the following steps:

(1) Set index assembly 17 so that ball contact 63' may be engaged with any convenient tooth spacing as indicated in FIG. 23.
(2) Set index assembly 16 so that ball contact 63 may be engaged in a tooth space adjacent to the center line through the fulcrum and the ball contact 90.
(3) Test the gear as outlined above in connection with the gear having an even number of teeth.

Figures 24, 25:
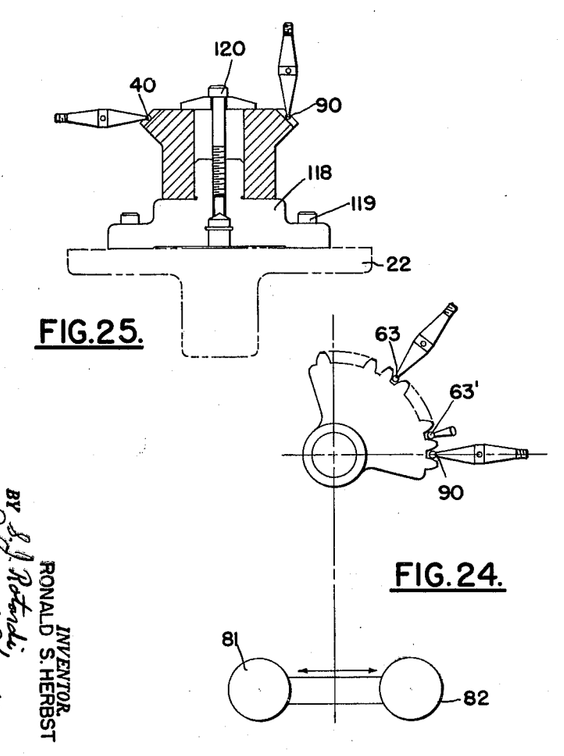
FIG. 24 is an explanatory diagram relating to the testing of a segmental gear.
FIGS. 25 to 29 are partial sectional views showing set-ups of the fixture for testing the angular transmission of different types of gears, the set-up of FIG. 25 being for straight or spiral bevel gears, the set-up of FIG. 26 being for internal gears, the set-up of FIG. 27 being for spur, spiral or helical gears, and the set-up of FIGS. 28 and 29 being for segment gears.

In testing a gear such as that indicated by FIG. 24, the ball contacts 90, 63 and 63' are arranged as indicated and the procedure outlined above is followed.

Figure 26:
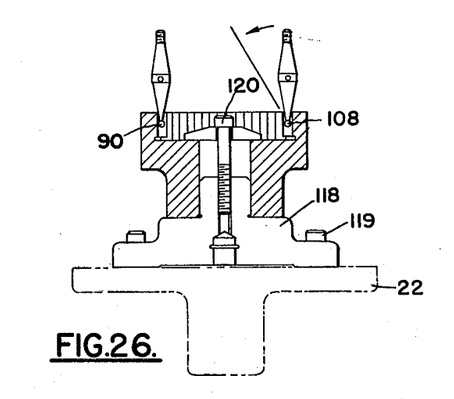
Figure 27:
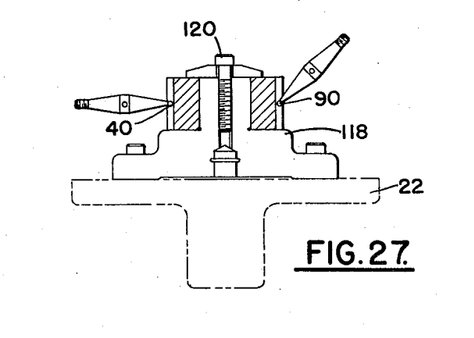
Figure 28:
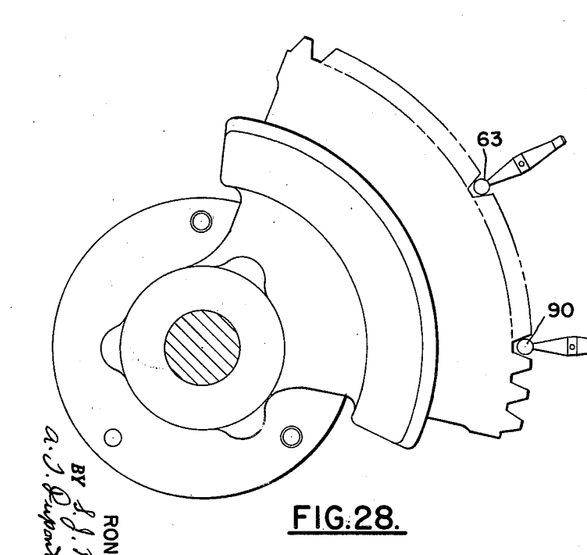
Figure 29:
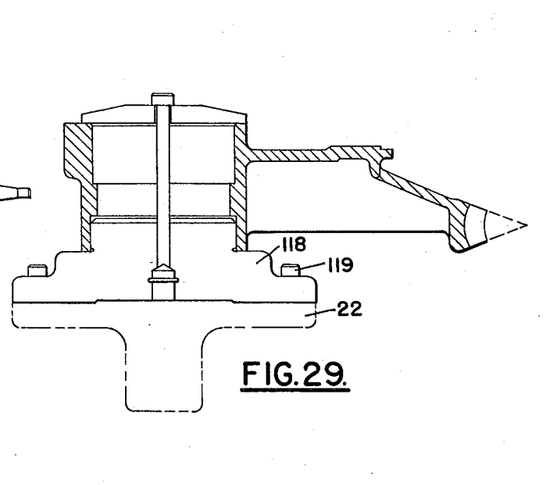

FIGS. 20 and 25 to 29 illustrate set-ups for testing different types of gears, the various reference numerals indicating the same elements or parts as in the previous figures. Thus the set-up of FIG. 20 is for testing the angular transmission on worm wheels, the set-up of FIG. 25 is for testing the angular transmission on straight and spiral bevel gears, the set-up of FIG. 26 is for testing the angular transmission of internal gears, the set-up of FIG. 27 is for testing the angular transmission on spur, spiral and helical gears, and the set-up of FIGS. 28 and 29 is for testing the angular transmission on segment gears. It is to be remembered that the sector index 63 or 63' is to be used in testing segment gears having an odd number of teeth and internal gears and that the rail index 40 is to be used for testing gears with an even number of teeth.

*Testing accuracy of a worm and worm wheel*

For testing the accuracy of a worm and worm wheel, certain additional attachments to the test fixture are required. Among these attachments are an adapter for positioning the worm wheel, a worm holder or adapter assembly, an indicator stand and certain gaging devices. The relation between the test fixture and these attachments is indicated by FIGS. 32 to 39. Also appearing in these figures are a worm 127 and a worm wheel 128 which are to be tested for their alinement with one another.

Figures 34, 38:
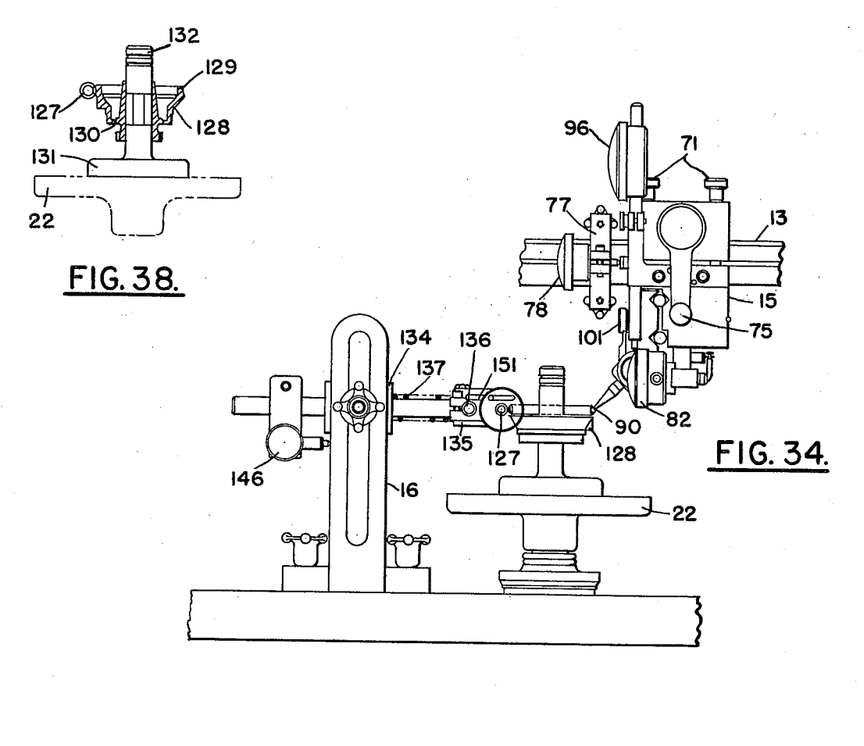

As indicated more particularly in FIG. 38, the worm wheel 128 is a cup-shaped member with an upright central tubular portion surrounded by an annular bearing surface 130. The worm wheel 128 is supported upon an adapter 131 which is fixed to the face plate 22 and has its upwardly extending pedestal slightly beveled so that the worm wheel is readily fixed to the adapter by tightening a nut 132 against a tapered bushing seated in the central tubular part of the worm wheel. The worm wheel 128 has a gear 129 which is meshed with the worm 127 during the test.

The assembly for positioning the worm 127 includes a shank 133 which is supported in a bushing 134 fixed to the sector 16 of the test fixture. The shank 133 has a bifurcated rectangular end 135 which receives a rod 136 and is biased toward the worm 127 by a spring 137. A nut 138 (FIG. 39) functions to clamp the rod 136 to the rectangular head of the shank 133.

Mounted on the rod 136 are (1) a gaging pin 139 adapted to cooperate with a gage contact point 140 (FIG. 39), (2) a support 141 adapted to receive the globular enlargement 142 at the end of the worm shaft 143, and (3) a support 144 having a V-shaped groove adapted to rest against the shaft 143. Mounted on worm shaft 143 is an index knob 145, carrying a retractable gage pin 151. For measuring the pitch diameter concentricity of the worm an indicator 146 is adjustably fixed to the shank 133 of the worm holder assembly. Additional items utilized in certain of the tests are an indicator assembly 147 and a spacer gage 148 (FIG. 33).

In testing the accuracy of the worm and worm wheel, it is to be assumed that the worm wheel 128 has passed the analytical test as indicated in connection with FIG. 20 and that the angular transmission tolerances have been found to be within allowable limits and properly recorded in the above chart.

The tests for axial alinement of the worm and worm wheel, for location of the worm axis with respect to the thrust or mounting surface 130 of the worm wheel and for parallelism of the worm shaft with the thrust surface are initiated by disengaging the ball point 90 (FIG. 35) being careful not to upset the initial zero setting of the translation indicators 81 and 82. Thereupon the worm holder assembly is mounted in the sector 16 so as to engage the worm with the worm wheel and is clamped in this position. Under these conditions, the respective axial relation between the worm and worm wheel is governed solely by the fit of the corresponding angles of the worm thread and the tooth space engaged.

Figure 32:
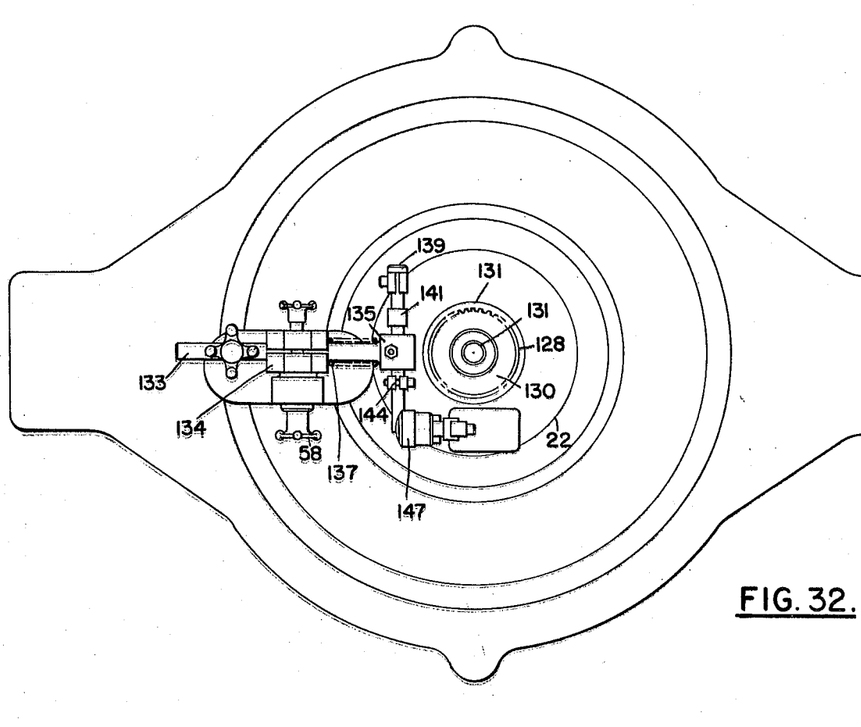
FIGS. 32 to 39 illustrate different arrangement of the fixture for testing the accuracy of a worm and worm wheel.
Figure 33:
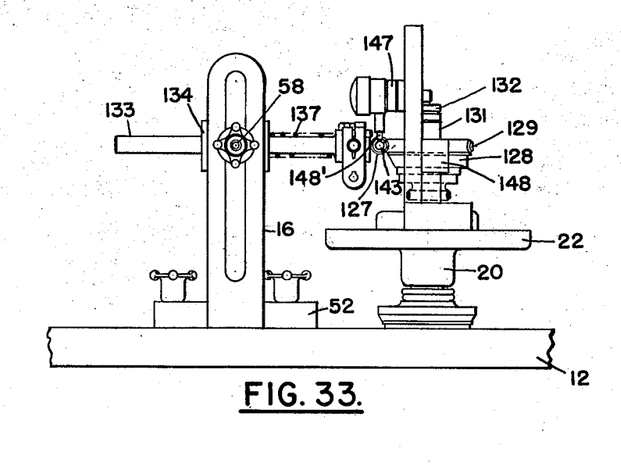

The indicator assembly 147 is next placed on the face plate 22 (as indicated in FIGS. 32 and 33) with its contact member 148' directly over the 0.250 inch diameter shaft 143, the indicator is adjusted to zero reference, and the entire length of the worm shaft is checked. The deviation should not exceed .001 of an inch. Following this, the spacer gage 148 is placed over the worm wheel (as indicated in FIG. 33) without disturbing the indicator from its initial zero setting and the indicator contact 148' is passed over the top of the spacer gage. The deviation should not exceed .001 of an inch between readings.

The analytical test of the worm involves checking pitch diameter concentricity and pitch and lead error. In checking pitch diameter concentricity, the worm is placed in the spherical bearing of the support 141, the V-groove bearing 144 is adjusted to eliminate all end play, clamping screw 149 is tightened, the worm holder assembly is adjusted to engage the worm and worm wheel in normal operating position, and clamping screw 150 is tightened. With the worm thus positioned, the indexing and operating knob 145 is secured to the worm shaft by means of a set screw (not shown) and the indicator 146 is adjusted to zero. Under these conditions, the knob 145 is rotated substantially one complete revolution, the highest reading of the indicator 146 is noted (representing worm shaft movements transverse to its axis), the indicator 146 is adjusted to zero, knob 145 is rotated substantially one complete revolution in the opposite direction and the highest reading is noted. The difference between the high and low readings represent the pitch diameter runout of the worm.

Figure 36:
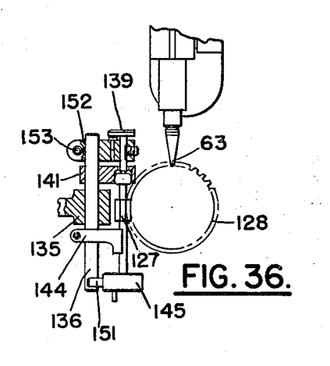
Figure 37:
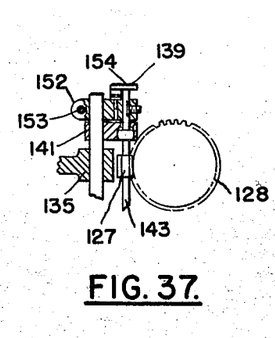
Figure 39:
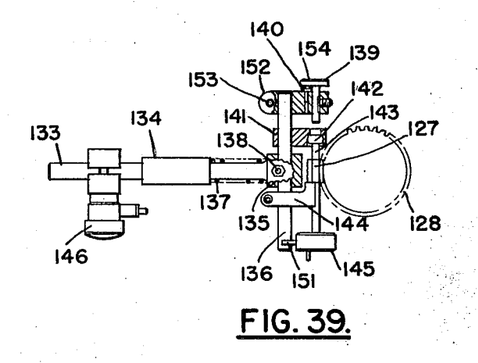

In testing the worm for pitch and lead error the V-groove bearing 144 is reversed and secured in a position to provide approximately one-quarter of an inch clearance from the end of the worm as indicated in FIG. 36. Sector index ball point 63 is adjusted to secure the worm wheel 128 against rotation. The pin 151 is retracted and knob 145 is rotated clockwise so that the spherical bearing of the worm is seated in the forward most position of the spherical bearing 141. Then knob 145 is rotated counterclockwise at least one and one-quarter turns, and the gage pin 151 is reprojected so that gage pin 151 is in contact with rod 136 as the knob 145 is rotated in a counterclockwise direction. If necessary, the knob 145 may be adjusted by its set screw about worm shaft 143 for this purpose.

With the gage pin 139 in constant pressure contact with bracket contact point 140, the bracket 152 is slid forward on rod 136 to place pin 139 into contact with the end of the worm shaft as indicated in FIG. 36, and the bracket is clamped to the rod by tightening screw 153. The gage pin 151 is slidingly retracted into the body of knob 145 by handle 156 (FIG. 35), pin 151 becoming disengaged from contact with rod 136. Knob 145 is rotated by handle 156 approximately one and one-quarter revolutions in a clockwise direction. Thereupon the gage pin is reprojected and the knob 145 is rotated in a counterclockwise direction until pin 151 contacts the rod 136. With a slight finger pressure on the gage pin 139 at the point 154, gage blocks (not shown) are utilized to measure the gap between the gage pin 139 and the bracket 152. This measurement represents the actual pitch and lead of the worm 127.

The functional test of the worm 127 and worm wheel 128 involves checking the worm and worm wheel with respect to (1) their composite error, (2) their accumulative error, and (3) their compatibility.

In checking the composite error of the worm and worm wheel, the sector ball point 63 (FIG. 35) is engaged in an appropriate tooth space of the worm wheel 128 so that the indicator carriage ball point 90 may be engaged in tooth space No. 1, simulating the original set-up of the angular transmission measurement. Indicators 81 and 82 are set to the appropriate angular transmission reading recorded in column five of the above chart, and the indicators 78 and 96 are set to zero. The worm holder assembly is so adjusted that the worm is engaged snugly with the worm wheel, the V-groove bearing 144 is adjusted so as to eliminate end play, clamping screws 150 and 149 are tightened, knob 145 is set so that rod 136 and gage pin 151 are in contact, and knob is fixed to the worm wheel shaft 143 by means of its clamping or set screw.

At this point, it is desirable to recheck the settings of the indicators 78, 81, 82, and 96, the engagement of the ball point 63 with the worm wheel, the engagement of the rod 136 and gage pin 151, and the clamping of the knob 145 to the worm shaft 143. Appropriate corrections should be made if required.

With these adjustments made, the ball point 90 is disengaged by means of lever 75 (FIG. 35), the ball point 63 is disengaged by means of keeper 155, pin 151 is retracted by means of handle 156, knob 145 is rotated ten and one-quarter revolutions in a clockwise direction, pin 151 is extended, and knob 145 is rotated in a counterclockwise direction until pin 151 engages rod 136.

Since one turn of the worm is equal to the displacement of one tooth space of the worm wheel, tooth space No. 10 should now occupy the identical position of tooth space No. 1 of the initial setting.

The indicator ball point 90 is engaged in tooth space No. 10 by means of lever 75 and the reading of the appropriate indicator 81 or 82 is noted and entered on a gear chart in column No. 5 opposite tooth space 10. Similar readings of selected tooth spaces are taken and similarly entered. The readings thus obtained equal the composite errors.

The accumulative error of the worm and worm wheel is checked by starting with the tooth space having the greatest composite error. This is done by engaging the ball point 90 in this tooth space, adjusting indicators 81 and 82 to zero with gage pin 151 and rod 136 engaged, setting indicators 78 and 96 to zero, disengaging ball point 90 by means of lever 75, retracting gage pin 151, rotating knob 145 counterclockwise a sufficient number of turns, to cause the worm wheel to rotate one complete revolution, and extending pin 151 on the last revolution so that it contacts rod 136. With these adjustments made, the ball point 90 is engaged in the tooth space and the reading of the indicator 81 or 82 is recorded with its appropriate plus or minus indication. Similar readings are taken with the ball point in the tooth spaces immediately leading and following the tooth space having the greatest composite error. An example of these readings may be as follows:

| | |
|---|---|
| Initial setting | 0 |
| Initial setting one revolution | −.0002 |
| Initial setting one revolution minus one space | −.0004 |
| Initial setting one revolution plus one space | +.0006 |
| Total accumulative error | 0.0010 |

As indicated by the above example, the accumulative error is equal to the sum of the greatest plus and greatest minus errors.

Compatibility of the worm and worm wheel depends on the quality of the fit deriving from the pressure angle, the helix angle, the worm thread shape, and the worm wheel tooth shape. The most frequent cause of trouble is due to the incorrect setting of the worm thread cutter helix angle. To test and correct this condition the worm and wheel should be produced simultaneously and the first sample of each should be subjected to the following tests and corrective action.

Figure 35:
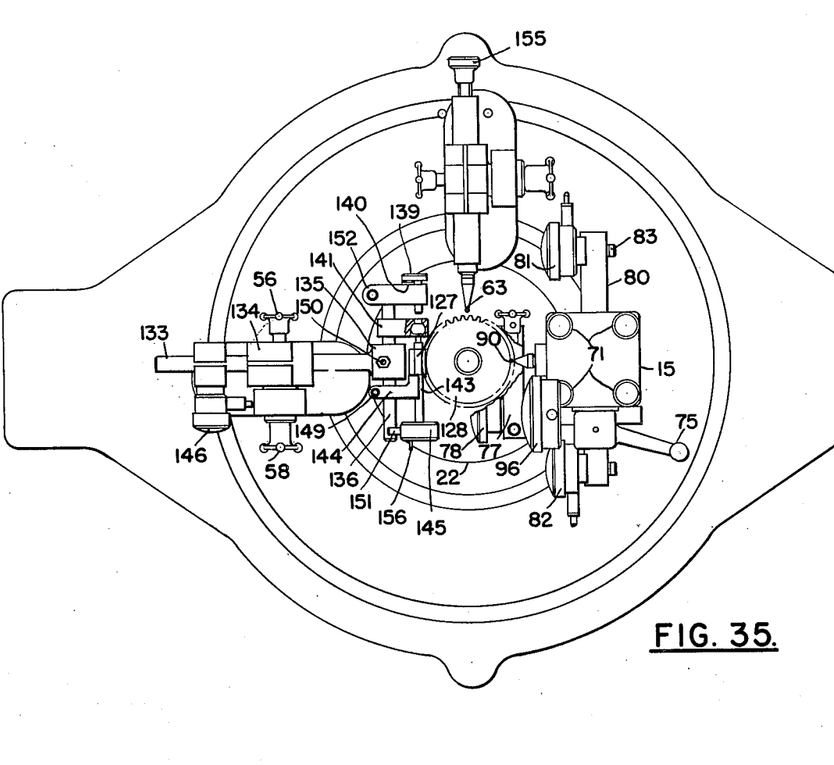

With the worm and worm wheel set-up as shown in FIGS. 34 and 35 apply a light coating of Prussian blue to the bearing surfaces of the worm thread. Rotate the worm clockwise until the wheel completes one revolution. Then rotate the worm in a counterclockwise direction until the worm wheel has returned to its original position. Examine the bearing surfaces made by the rotating worm on both sides of the worm wheel teeth.

For machine cut and finished worms and worm gears a sixty percent bearing surface is considered good, and a thirty percent bearing surface is considered adequate and acceptable. Less than thirty percent bearing surface is inadequate and should be rejected. The ideal location of the bearing surface is in the central zone of the tooth flank. Bearing surfaces that appear less than half way from the central zone of the tooth flank in any direction should be rejected. Bearing surfaces requiring better than a sixty percent bearing should be lap finished.

The bearing condition may be improved by compensating the helix angle setting of the worm thread cutter or the grinding wheel as the case may be. It should be remembered, however, that this is a very critical setting where minute changes in the helix angle setting will radically affect the bearing of the worm thread against the worm wheel teeth. The object of the compensation is to simulate as close as possible the original helix angle of the hub used for cutting the worm wheel.

I claim:

1. A gear testing fixture comprising a base having a pair of concentric circular guideways and supporting a pair of uprights, a spindle supporting a face plate and rotatably mounted upon said base within said guideways, a rail extending across the rotational axis of said spindle and between said uprights, an index carriage assembly carried by and movable along said rail and having an index ball contact, an indicator carriage assembly carried by and movable along said rail and having thereon indicating means actuated by a movable mounted indicator ball contact, means for adjusting said rail to center said indicator ball contact with respect to the rotational axis of said spindle, and a pair of sector index assemblies each supported in and movable along said guideways and each having an index ball contact supported on means adjustable toward and away from said rotational axis by virtue of which each of said ball contacts may be moved radially toward said spindle for indexing and high-precision measuring of gears when positioned upon said face plate.

2. A gear testing fixture comprising a base having a pair of concentric circular guideways and supporting a pair of uprights, a spindle supporting a face plate and rotatably mounted upon said base within said guideways, a rail extending across the rotational axis of said spindle and between said uprights, an index carriage assembly carried by and movable along said rail and having an index ball contact, an indicator carriage assembly carried by and movable along said rail and having thereon indicating means actuated by a movably mounted indicator ball contact, and a pair of sector index assemblies each supported in and movable along said guideways and each having an index ball contact supported on means adjustable toward and away from said rotational axis, all of said index ball contacts being adjustable to a plane parallel to said face plate and including said indicator ball contact by virtue of which each of said ball contacts may be moved radially toward said spindle for indexing and high-precision measuring of gears when positioned upon said face plate.

3. A gear testing fixture comprising a base having a pair of concentric circular guideways and supporting a pair of uprights, a spindle supporting a face plate and rotatably mounted upon said base within said guideways, a rail extending across the rotational axis of said spindle and between said uprights, an index carriage assembly carried by and movable along said rail and having an index ball contact adjustable toward and away from the rotational axis of said spindle, an indicator carriage assembly carried by and movable along said rail and having thereon a movably mounted indicator ball contact, a translation indicator adjustably mounted upon said indicator carriage assembly and actuated by said indicator ball contact, and a pair of sector index assemblies each supported in and movable along said guideways and each having an index ball contact supported on means adjustable toward and away from said rotational axis, all of said index ball contacts being adjustable to a common plane which includes said indicator ball contact and is parallel to said face plate by virtue of which each of said ball contacts may be moved radially toward said spindle for indexing and high-precision measuring of gears when positioned upon said face plate.

4. A fixture according to claim 3 wherein all of said ball contacts are resiliently supported.

5. A fixture according to claim 3 wherein a pressure indicator is adjustably mounted on said indicator carrying assembly and actuated by said indicator ball contact.

6. A fixture according to claim 5 wherein a cam is positioned between said indicator ball contact and said pressure indicator and a shaft interconnects said cam and said indicator ball contact.

7. A fixture according to claim 3 wherein a pitch radius indicator is carried by said rail and engaged by said indicator carriage assembly.

8. A fixture according to claim 3 wherein said rail is a square-shaped rack and said index carriage assembly and said indicator carriage assembly have gears meshing with said rack.

9. A fixture according to claim 8 wherein means are provided for rotatably adjusting said rack about its longitudinal axis.

10. A fixture according to claim 3 wherein a carriage carrying said indicator ball contact has a pair of V-shaped grooves, ball bearings in said grooves, and spiral spring means biasing said carriage toward said indicator carriage assembly and against said ball bearings.

(References on following page)

References Cited by the Examiner

UNITED STATES PATENTS

| | | | |
|---|---|---|---|
| 2,637,908 | 5/53 | Hedman | 33—179.5 |
| 2,724,901 | 11/55 | Davies | 33—179.5 |
| 3,011,780 | 12/61 | Hanisko | 33—174 |

FOREIGN PATENTS

| | | |
|---|---|---|
| 887,651 | 11/43 | France. |
| 66,276 | 6/56 | France (addition to No. 1,090,408). |
| 618,927 | 9/35 | Germany. |

OTHER REFERENCES

German printed application R16161 II/20h, Apr. 5, 1956.

LOUIS R. PRINCE, *Primary Examiner.*

LEONARD FORMAN, ISAAC LISANN, *Examiners.*